US011986935B2

(12) United States Patent
Chen

(10) Patent No.: US 11,986,935 B2
(45) Date of Patent: May 21, 2024

(54) CRIMPING PLIERS

(71) Applicant: ZHEJIANG VASUNG TOOLS CO., LTD., Wenzhou (CN)

(72) Inventor: Wang Hua Chen, Wenzhou (CN)

( * ) Notice: Subject to any disclaimer, the term of this patent is extended or adjusted under 35 U.S.C. 154(b) by 428 days.

(21) Appl. No.: 17/345,028

(22) Filed: Jun. 11, 2021

(65) Prior Publication Data

US 2021/0331293 A1 Oct. 28, 2021

Related U.S. Application Data

(63) Continuation of application No. PCT/CN2020/094540, filed on Jun. 5, 2020.

(30) Foreign Application Priority Data

Apr. 28, 2020 (CN) ......................... 202010347866.5

(51) Int. Cl.
*B25B 7/06* (2006.01)
*H01R 43/042* (2006.01)

(52) U.S. Cl.
CPC ............. *B25B 7/06* (2013.01); *H01R 43/042* (2013.01)

(58) Field of Classification Search
CPC ................................ B25B 7/06; H01R 43/042
USPC ........ 81/342, 345, 348, 381–383.5, 361–362
See application file for complete search history.

(56) References Cited

U.S. PATENT DOCUMENTS 137,745 A * 4/1873 Whitney .............. A01G 25/023 30/363
146,829 A * 1/1874 Lindsay .................... B25B 5/12 30/193
698,086 A * 4/1902 Wardwell et al. ...... B25B 13/16 81/186
5,996,450 A * 12/1999 St. John .................... B25B 7/02 81/416

(Continued)

FOREIGN PATENT DOCUMENTS

CN 107000174 A 8/2017
CN 207677236 U 7/2018
EP 2949429 A1 12/2015

OTHER PUBLICATIONS

Written Opinion of the International Search Authority in corresponding International application No. PCT/CN2020/094540.

*Primary Examiner* — Hadi Shakeri
(74) *Attorney, Agent, or Firm* — Daniel M. Cohn; Howard M. Cohn

(57) ABSTRACT

The present disclosure provides self-adaptive laborsaving crimping pliers including a connecting handle, a movable handle, and a pliers head arranged on one end of the connecting handle and the movable handle. The connecting handle is bifurcated to form connecting arms rotatably arranged on the pliers head and elastic support arms. The connecting arms forms a linkage between the connecting handle and the pliers head. The movable handle is bifurcated to form movable connecting arms and elastic driving arms. The movable connecting arms are rotatably arranged on the pliers head and forms a linkage between the movable handle and the pliers head. The elastic driving arms are rotatably arranged on the elastic support arms to make the movable handle rotatably connect with the connecting handle. Limiting portions are arranged on the elastic support arms. A (Continued)

tension spring is arranged between the limiting portions and the movable handle.

16 Claims, 4 Drawing Sheets

(56) References Cited

U.S. PATENT DOCUMENTS

| | | | | |
|---|---|---|---|---|
| 6,612,206 | B1 * | 9/2003 | Heggemann | B25B 27/146<br>81/392 |
| 9,634,451 | B2 * | 4/2017 | Battenfeld | H01R 43/042 |
| 11,465,265 | B2 * | 10/2022 | Ullbors | B25B 7/14 |
| 2016/0111840 | A1 | 4/2016 | Battenfeld | |
| 2016/0185000 | A1 * | 6/2016 | Huang | B26B 13/16<br>30/262 |

* cited by examiner

CRIMPING PLIERS

TECHNICAL FIELD

The present disclosure relates to a field of crimping tool technology, and in particular to self-adaptive laborsaving crimping pliers.

BACKGROUND

Crimping pliers are tools for crimping terminals and wires. Different crimping pliers are selected for crimping according to different terminals. Conventional crimping pliers for crimping tubular terminals generally do not have an adaptive function, and they need to be adjusted in according to size of a terminal before crimping, which is cumbersome in operation, has a narrow application area, and is not universal. Manual crimping pliers comprise a pliers head for crimping terminals, a connecting handle, a movable handle, and a transmission mechanism arranged between the connecting handle and the movable handle.

Structural design of the transmission mechanism of the pliers head of the conventional crimping pliers is unreasonable, structure of the transmission mechanism is relatively complicated, resulting in a larger volume of the crimping pliers, and an operator is more laborious in use, which increases labor strength of the operator. Moreover, the conventional crimping pliers further has defects of complex structure, unreliable performance, and inconvenient operation.

SUMMARY

An object of the present disclosure is to overcome defects in the prior art and provide self-adaptive laborsaving crimping pliers with simple structure, stable and reliable performance, and convenient operation.

To achieve the above object, the present disclosure provides self-adaptive laborsaving crimping pliers. The crimping pliers, comprise a connecting handle, a movable handle, and a pliers head arranged on one end of the connecting handle and one end of the movable handle. The one end of the connecting handle is bifurcated to form connecting arms and elastic support arms. The connecting arms are rotatably arranged on the pliers head and forms a linkage between the connecting handle and the pliers head. The one end of the movable handle is bifurcated to form movable connecting arms and elastic driving arms. The movable connecting arms are rotatably arranged on the pliers head and forms a linkage between the movable handle and the pliers head. The elastic driving arms are rotatably arranged on the elastic support arms to make the movable handle rotatably connect with the connecting handle. Limiting portions are arranged on the elastic support arms. A tension spring is arranged between the limiting portions and the movable handle.

Furthermore, the crimping pliers further comprises two handle sleeves. The connecting handle and the movable handle are wrapped by a respective handle sleeve.

Furthermore, the connecting handle and the movable handle are clamped with the respective handle sleeve.

Furthermore, a limiting shaft is arranged on a bifurcation of the movable handle. A positioning shaft is arranged on the limiting portions. Two ends of the tension spring are separately connected to the limiting shaft and the positioning shaft, so it is convenient to assemble the tension spring with the movable handle and the connecting handle, and a connection between the tension spring and the movable handle and the connecting handle is compact, which improves reliability of the crimping pliers.

Furthermore, the movable handle comprises two movable handle plates stacked with each other. The two movable handle plates are fixed together and arranged at intervals. The elastic support arms of the connecting handle are rotatably connected between the two movable handle plates. The tension spring is arranged between the two movable handle plates.

Furthermore, the connecting handle comprises two connecting handle plates stacked with each other. The two connecting handle plates are fixed together, and the elastic support arms of the two connecting handle plates are rotatably connected between the elastic driving arms of the two movable handle plates.

Furthermore, the pliers head comprises a gear ring rotatably arranged on the movable connecting arms, two gear ring cover plates, and a plurality of crimping teeth distributed in an annular array. The two gear ring cover plates are separately arranged on two sides of the gear ring and rotatably connected with the connecting arms. An accommodating cavity is formed between the gear ring and the two gear ring cover plates. The plurality of crimping teeth are respectively rotatably arranged in the accommodating cavity. Each crimping tooth is in linkage with the gear ring. Each crimping tooth moves along with the gear ring for mutual engagement between the crimping teeth. The gear ring and gear ring cover plates of the pliers head are respectively connected with the movable connecting arms and the connecting arms. When crimping, the movable handle and the connecting handle respectively drive the gear ring and the gear ring cover plates to move, and the gear ring and the gear ring cover plates rotate oppositely with respect to each other. Then the gear ring drives the crimping teeth to move, so crimping of the crimping pliers to a terminal is realized. The movable handle and the connecting handle respectively drive the gear ring and the gear ring cover plates to move with respect to each other, which effectively reduce a rotation arc of a single component, and facilitate to reduce a crimping stroke of the movable handle and the connecting handle, so that the crimping of the crimping pliers is easy and labor-saving.

Furthermore, one end of each crimping tooth comprises a stop portion. The gear ring comprises tooth grooves on an inner side of the gear ring. Each tooth groove corresponds to each stop portion of each crimping tooth. Each stop portion is engaged in each tooth groove to form a linkage between each crimping tooth and the gear ring. Another end of each crimping tooth comprises a crimping portion. A wire crimping space is formed between each two adjacent crimping portions of the crimping teeth. Each crimping tooth is rotatably arranged on a corresponding rotating shaft arranged between the two gear ring cover plates.

Each crimping tooth is rotatably arranged on the corresponding rotating shaft, and each rotating shafts are arranged at one end of each crimping portion closer to the crimping teeth, which increases a length of a power arm of each crimping tooth, and saves effort during crimping. The movable handle is linked to the crimping teeth, so the crimping teeth moves along with an action of the movable handle and the crimping teeth are engaged with each other, thereby realizing the crimping of the crimping pliers.

Furthermore, an end surface of each stop portion is an arc-shaped end surface. A bottom surface of each tooth grooves is an arc-shaped bottom surface. Each arc-shaped end surface is in surface contact with each arc-shaped bottom surface, or there is a certain gap between each arc-shaped end surface and each arc-shaped bottom surface.

Furthermore, an arc groove is arranged on one side of each stop portion of each crimping tooth. Each arc groove is configured to leaving a space for avoiding a corner of an opening of each tooth groove. A direction of the opening of each arc groove is same as a clockwise rotation direction of the gear ring.

Furthermore, a side surface of each tooth groove opposite to the arc-shaped groove is an arc-shaped side surface or an inclined side surface. The side surface of each tooth groove faces a respective rotating shaft.

Furthermore, the crimping portion of each crimping tooth comprises crimping bosses on opposite sides. A shape of each crimping boss is consistent with a shape of the crimping portion of each crimping tooth. Each gear ring cover plate comprises a crimping port communicated with the accommodating cavity, and each crimping boss extends into a corresponding crimping port.

Furthermore, a return groove is arranged on an inner wall of each crimping port. The return grooves one-to-one corresponds to the crimping bosses. When each crimping tooth is in a relaxing action, each crimping boss diverges outwardly, moves back, and inserts into a corresponding return groove.

Furthermore, a tip of a cross section of each crimping boss arranged on any side has an included angle $\theta$, where $\theta=360°/n$. n is a total number of the crimping bosses on one side and $n\geq 2$.

Furthermore, side portions of any two adjacent crimping portions abut against each other and rotate in a clockwise direction or a counterclockwise direction. The tip of a next crimping portion is arranged on a side of a previous crimping portion. n crimping portions form a closed loop and are located in a middle portion to form the wire crimping space. The wire crimping space is n-sided.

In the self-adaptive laborsaving crimping pliers of the present disclosure, a bifurcation is provided at one end of the movable handle and one end of the connecting handle respectively. Three connection fulcrums are formed between the movable handle, the connecting handle, and the pliers head. A linkage mechanism is formed between the bifurcation of the movable handle and the bifurcation of the connecting handle. When in use, the moving handle and connecting handle drive the pliers head to crimp, which reduces a crimping stroke of the moving handle and connecting handle. Further, a size of the crimping pliers is small and is convenient for a user to use. When the pliers head is crimping terminals of different diameters, the pliers head contacts the terminals and crimping force is fed back to the elastic support arms and the elastic driving arms. The elastic support arms and the elastic driving arms perform a buffering role. Under condition of ensuring the crimping force, the elastic support arms and the elastic driving arms are deformed to complete a crimping action of the movable handle and the connecting handle, so as to achieve a purpose of self-adaptation. The crimping of the crimping pliers is laborsaving, and effectively reduces labor intensity of the user. The elastic support arms and the connecting handle, the elastic driving arm and the movable handle are all integrated structures. The movable handle and the connecting handle are connected by a double elastic arm structure, which makes the crimping easy and has a longer service life. Therefore, the crimping pliers have advantages of simple structure, stable and reliable performance, and convenient operation.

BRIEF DESCRIPTION OF DRAWINGS

In order to illustrate technical solutions in the embodiments of the present disclosure clearly, the drawings that need to be used in the description of the embodiments or the prior art are briefly described as follow. Apparently, the drawings in the following description are merely some of the embodiments of the present disclosure, and those skilled in the art are able to obtain other drawings according to the drawings without contributing any inventive labor.

In the drawings.

Figure 1:
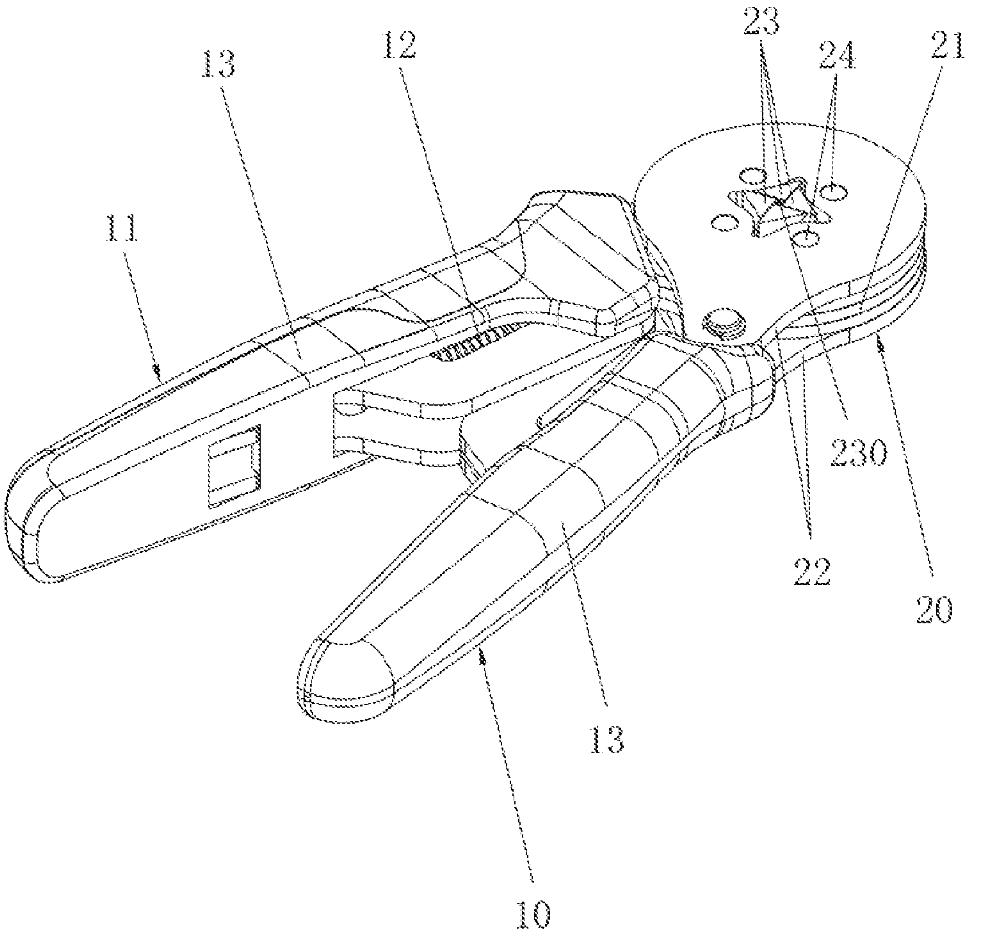
FIG. 1 is a perspective schematic diagram of self-adaptive laborsaving crimping pliers according to one embodiment of the present disclosure.

| | | | |
|---|---|---|---|
| Long handle | 10 | movable handle | 11 |
| Pliers head | 20 | Connecting arm | 101 |
| Elastic support arm | 102 | Movable connecting arm | 111 |
| Elastic driving arm | 112 | Limiting portion | 103 |
| Tension spring | 12 | Handle sleeve | 13 |
| Long handle plate | 100 | Movable handle plate | 110 |
| Limiting shaft | 14 | Positioning shaft | 15 |
| Gear ring cover plate | 22 | Crimping tooth | 23 |
| Accommodating cavity | 200 | Gear ring | 21 |
| Stop portion | 231 | Tooth groove | 211 |
| Crimping portion | 232 | Wire crimping space | 230 |
| rotating shaft | 24 | | |

DETAILED DESCRIPTION

In order to make the above objects, features, and advantages of the present disclosure clear and understood, specific embodiments of the present disclosure will be described in detail below with reference to the accompanying drawings. The specific embodiments described here are only used to explain the present disclosure, but not intended to limit the present disclosure.

It should be notated that when a component is considered to be "fixed on" or "arranged on" another element, it may be directly fixed to the another element or it may be fixed to the another element through an intermediate element. In contrast, when the element is "directly connected" with the another component, there is no intermediate element. When a component is considered to be "connected with" another element, it may be directly connected to the another element or there may be an intermediate element.

It should be understood that terms such as "length", "width", "upper", "lower", "front", "rear", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include at least one feature. In the description of the present disclosure, the meaning of "a plurality of" is at least two, unless otherwise specified.

As shown in FIGS. 1-4, the present disclosure provides self-adaptive laborsaving crimping pliers. The crimping pliers comprise a connecting handle 10, a movable handle 11, and a pliers head 20 arranged on one end of the connecting handle 10 and one end of the movable handle 11. The one end of the connecting handle 10 is bifurcated to form connecting arms 101 and elastic support arms 102. The connecting arms 101 are rotatably arranged on the pliers head 20 and forms a linkage between the connecting handle 10 and the pliers head 20. The one end of the movable handle 11 is bifurcated to form movable connecting arms 111 and elastic driving arms 112. The movable connecting arms 111 are rotatably arranged on the pliers head 20 and forms a linkage between the movable handle 11 and the pliers head 20. The elastic driving arms 112 are rotatably arranged on the elastic support arms 101 to make the movable handle 11 rotatably connect with the connecting handle 10. Limiting portions 103 are arranged on the elastic support arms 102. A tension spring 12 is arranged between the limiting portions 103 and the movable handle 11. The connecting handle 10 and the movable handle 11 are wrapped with a respective handle sleeve 13. The connecting handle 10 is formed by riveting two connecting handle plates 100, and the movable handle 11 is formed by riveting two moving handle plates 110. A limiting shaft 14 is arranged on a bifurcation of the movable handle 11. A positioning shaft 15 is arranged on the limiting portions 103. Two ends of the tension spring 12 are separately connected to the limiting shaft 14 and the positioning shaft 15. The tension spring 12 is separately connected to the limiting shaft 14 and the positioning shaft 15, so it is convenient to assemble the tension spring 12 with the movable handle 11 and the connecting handle 10, and a connection between the tension spring 12 and the movable handle 11 and the connecting handle 10 is compact, which improves reliability of the crimping pliers.

In the embodiment, the connecting handle 10 and the movable handle 11 are clamped with the respective handle sleeve 13, which effectively prevents the two handle sleeves 13 from detaching from the connecting handle 10 and/or the movable handle 11 under an action of external force, prevents rotation of the two handle sleeves 13 relative to the connecting handle 10 and/or the movable handle 11, and improves stability of the socket connection. That is, working reliability of the crimping pliers is further improved. Specifically, the connecting handle 10 and the movable handle 11 are protruding on both sides facing each other with clamping protrusions (not marked in the figures, but shown in FIGS. 1 and 2). The handle sleeves 13 comprise clamping ports (not marked in the figures) corresponding to the clamping protrusions. Each clamping protrusion is inserted into a corresponding clamping port to limit positions of the handle sleeves 13 in a sleeve direction and a circumferential direction.

In the embodiment, the movable handle 11 comprises two movable handle plates 110 stacked with each other. Shapes of the two movable handle plates 110 are the same. The two movable handle plates 110 are fixed together and arranged at intervals. The elastic support arms 102 of the two connecting handle plates 100 are rotatably connected between the elastic driving arms 112 of the two movable handle plates 110. The tension spring is arranged between the two movable handle plates. Specifically, the elastic support arms 102 of the two connecting handle plates 100 and the elastic driving arms 112 of the two movable handle plates 110 are rotatably connected by a connecting shaft, and are clamped and sleeved on one end of the connecting shaft through a C-shaped clamp spring to limit positions of the connecting handle plates in a axial direction.

Figure 2:
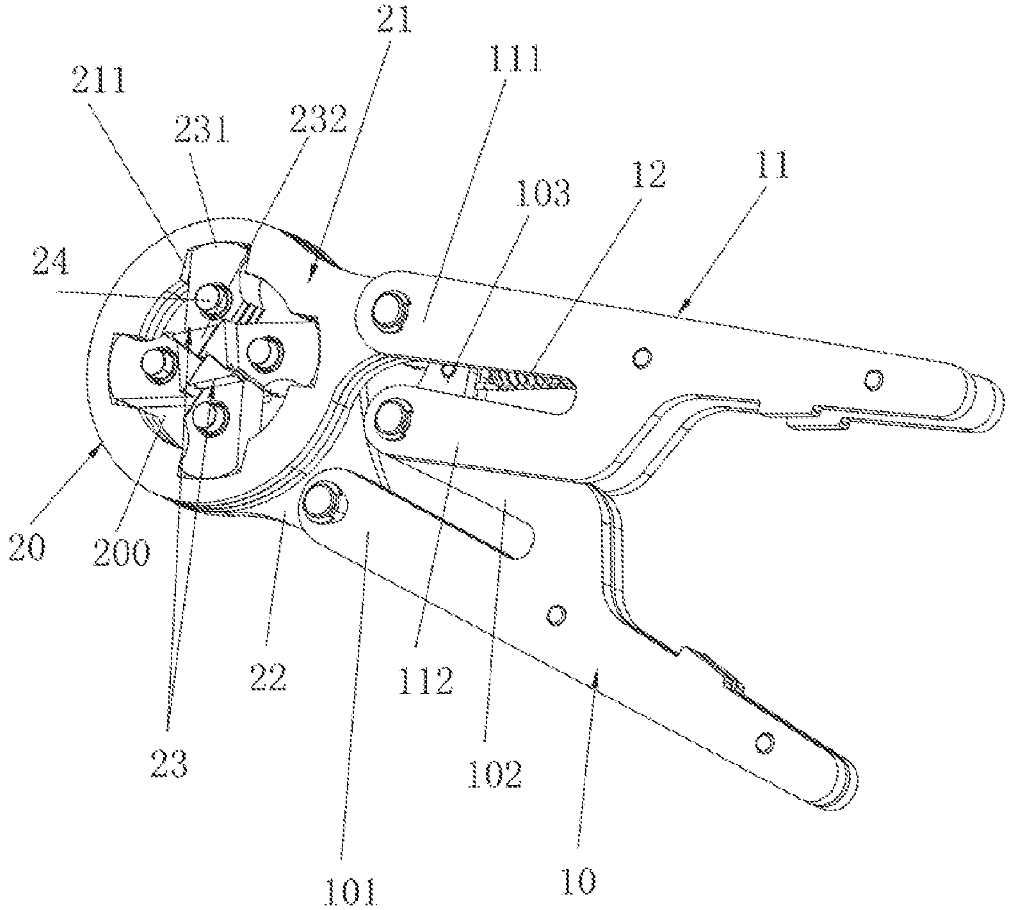
FIG. 2 is a schematic diagram showing interior structures of the self-adaptive laborsaving crimping pliers according to one embodiment of the present disclosure.
Figure 3:
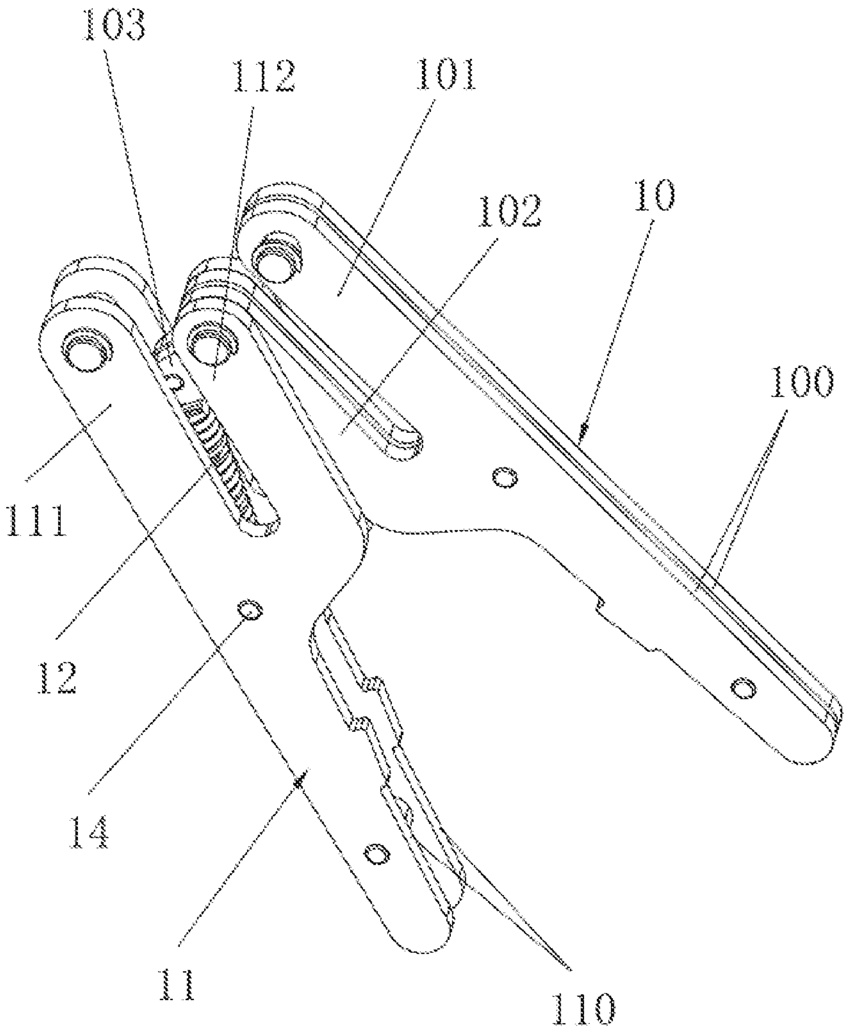
FIG. 3 is an assembly schematic diagram of a movable handle and a connecting handle according to one embodiment of the present disclosure.
Figure 4:
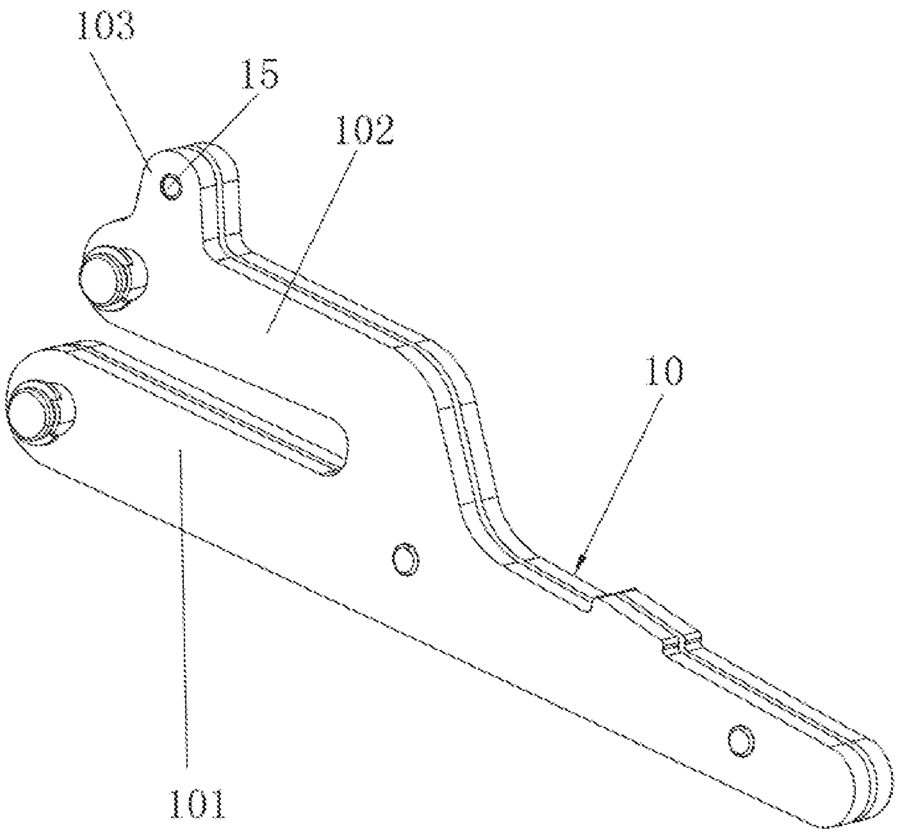
FIG. 4 is a perspective schematic diagram of the connecting handle according to one embodiment of the present disclosure.

As shown in FIGS. 1 and 2, the pliers head 20 comprises a gear ring 21 rotatably arranged on the movable connecting arms 111, two gear ring cover plates 22, and a plurality of crimping teeth 23 distributed in an annular array. The two gear ring cover plates 22 are separately arranged on one of a respective gear ring 21 and rotatably connected with the connecting arms 101. An accommodating cavity 200 is formed between the gear ring 21 and the two gear ring cover plates 22. The plurality of crimping teeth 23 are respectively rotatably arranged in the accommodating cavity 200. Each crimping tooth 23 is in linkage with the gear ring 21. Each crimping tooth 23 moves along with the gear ring 21 for mutual engagement between the crimping teeth 23. The gear ring 21 and gear ring cover plates 22 of the pliers head 20 are respectively connected with the movable connecting arms 111 and the connecting arms 101. When crimping, the movable handle 11 and the connecting handle 10 respectively drive the gear ring 21 and the gear ring cover plates 22 to move, and the gear ring 21 and the gear ring cover plates 22 rotate oppositely with respect to each other. Then the gear ring 21 drive the crimping teeth 23 to move action, so crimping of the crimping pliers to terminals is realized. The movable handle 11 and the connecting handle 10 respectively drive the gear ring 21 and the gear ring cover plates 22 to move with respect to each other, which effectively reduce a rotation arc of a single component, and facilitate to reduce a crimping stroke of the movable handle 11 and the connecting handle 10, so that the crimping of the crimping pliers is easy and labor-saving.

One end of each crimping tooth 23 comprises a stop portion 231. The gear ring 21 comprise tooth grooves 211 on an inner side of the gear ring 21. Each tooth groove 211 corresponds to each stop portion 231 of each crimping tooth 23. Each stop portion 231 is engaged in each tooth groove 211 to form a linkage between each crimping tooth 23 and the gear ring 21. Another end of each crimping tooth 23 comprises a crimping portion 232. A wire crimping space 230 is formed between each two adjacent crimping portions 232 of the crimping teeth 23. Each crimping tooth 23 is rotatably arranged on a corresponding rotating shaft 24 that arranged between the two gear ring cover plates 22.

Each crimping tooth 23 is rotatably arranged on the corresponding rotating shaft 24, and each rotating shaft 24 is arranged at one end of each crimping portion 232 closer to the crimping teeth 23, which increases a length of a power arm of each crimping tooth 23, and saves effort during crimping. The movable handle 11 is linked to the crimping teeth 23, so the crimping teeth 23 moves along with an action of the movable handle 11 and the crimping teeth 23 are engaged with each other, thereby realizing the crimping of the crimping pliers.

Furthermore, as shown in FIG. 2, an end surface of each stop portion 231 is an arc-shaped end surface. A bottom surface of each tooth grooves 231 is an arc-shaped bottom surface. Each arc-shaped end surface is in surface contact with each arc-shaped bottom surface, or there is a certain gap between each arc-shaped end surface and each arc-shaped bottom surface. Thus, when the gear ring 21 push the stop portions 231 of the crimping teeth 23 to rotate around the corresponding rotating shaft 24 under the action of the external force, on the one hand, such arrangement effectively prevents the end surface of each stop portion 231 and a bottom portion of each tooth groove 211 from scraping or positional interference, so the stop portions 231 and/or the gear ring 21 would not wear. On the other hand, it ensures smoothness of relative movement between the crimping teeth 23 and the gear ring 21, the relative movement between the crimping teeth 23 and the gear ring 21 does not cause jams; and also prevents generation of noise.

Furthermore, as shown in FIG. 2, an arc groove is arranged on one side of each stop portion 231 of each crimping tooth 23 comprises. Each arc groove is configured to leaving a space for avoiding a corner of an opening of each tooth groove 211. The corner of the opening of each tooth groove 211 is an edge at the opening of each tooth groove 211.

In the embodiment, when the connecting handle 10 and the movable handle 11 are moved close to each other under the action of the external force, the tension spring 12 is compressed, and the movable handle 11 drives the gear ring 21 to rotate clockwise with respect to the gear ring cover plates 22 arranged on the connecting handle 10. The stop portion 231 of each crimping tooth 23 is inserted into the corresponding tooth groove 211 on the inner side of the gear ring 21, so that the stop portions 231 are pushed to rotate clockwise around the corresponding rotating shafts 24. At this time, the crimping portions 232 of the crimping teeth 23 are gathered together to clamp the terminal to be crimped. At this time, the crimping pliers are in a crimped state. When the action of the external force on the connecting handle 10 and the movable handle 11 is released, elastic restoring force of the tension spring 13 bounces the movable handle 11 and/or the connecting handle 10. At this time, the movable handle 11 drives the gear ring 21 to rotate counterclockwise with respect to the gear ring cover plates 22 arranged on the connecting handle 10, pushes the stop portions 231 to rotate counterclockwise around the rotating shafts 24. The crimping portions 232 of the crimping teeth 23 are separated in a divergent manner, the terminal is not clamped and is able to be withdrawn. At this time, the crimping pliers are in a relaxed state.

That is, when the crimping teeth 23 are in the crimped state, the crimping portions 232 point to a center of the gear ring 21 or close to the center of the gear ring 21. When the crimping teeth 23 are in the relaxed state, the crimping portions 232 are far away from the center of the gear ring 21. Namely, the stop portions 231 are inclined with respect to the tooth grooves 211. Therefore, a direction of the opening of each arc groove is same as a clockwise rotation direction of the gear ring 21, so that the edge facing the arc-shaped groove of each crimping teeth moves smoothly in the arc-shapes groove whether the crimping teeth 23 are in the crimped state or in the relaxed state, which avoid positional interference.

Furthermore, as shown in FIG. 2, a side surface of each tooth groove 211 opposite to the arc-shaped groove is an arc-shaped side surface or an inclined side surface. The side surface of each tooth groove 211 faces a respective rotating shaft 24.

Thus, when the crimping teeth 23 are in the relaxed state, the end surface of each stop portion 231 smoothly rotates away from the bottom portion of each tooth groove 211 to avoid positional interference.

Furthermore, as shown in FIGS. 1 and 2, the crimping portion 232 of each crimping tooth 23 comprises crimping bosses (as shown in FIG. 1, the part exposed from the crimping port) on opposite sides. A shape of each crimping boss is consistent with a shape of the crimping portion 232 of each crimping tooth 23. Each gear ring cover plate 22 comprises a crimping port communicated with the accommodating cavity 200, and each crimping boss extends into a corresponding crimping port.

When the crimping teeth 23 are in the relaxed state, the crimping bosses abut against an inner wall of each crimping port. When the crimping teeth 23 are in the crimping state, the tips of the crimping bosses converge at the center of the crimping ports. In the embodiment, when the crimping teeth 23 are in the relaxed state, the tension spring 12 is still in a compressed state, that is, the connecting handle 10 and the movable handle 11 have a tendency to spring apart from each other. The crimping ports have a circumferential limiting effect on each crimping tooth 23, so that the connecting handle 10 and the movable handle 11 do not excessively bounce under the elastic restoring force of the tension spring 12, and ensure that the connecting handle 10 and the movable handle 11 maintain a certain opening angle in the relaxed state.

Furthermore, a return groove is arranged on an inner wall of each crimping port. The return grooves one-to-one corresponds to the crimping bosses. When each crimping tooth is in a relaxing action, each crimping boss diverges outwardly, moves back, and inserts into a corresponding return groove, which perform a guide function on one hand, and limit positions of the crimping bosses on the other hand. Optionally, a portion of each crimping boss inserted into the corresponding return groove is matched with the corresponding return groove. That is, a shape of the portion of each crimping boss inserted into the corresponding return groove is matched with a groove shape of the corresponding return groove.

In the embodiment, the return groove is a U-shaped groove, a C-shaped groove or a V-shaped groove, which is not limited hereto.

Furthermore, as shown in FIGS. 1 and 2, a tip of a cross section of each crimping boss arranged on any side has an included angle θ, where $\theta=360°/n$. n is a total number of the crimping bosses on one side and $n\geq2$. In the embodiment, $n=4$, $\theta=90°$. However, the specific number of n is not limited hereto.

Furthermore, as shown in FIGS. 1 and 2, side portions of any two adjacent crimping portions 232 abut against each other and rotate in a clockwise direction or a counterclockwise direction. The tip of a next crimping portion 232 is arranged on a side of a previous crimping portion. n crimping portions 232 form a closed loop and are located in a middle portion to form the wire crimping space 230. The wire crimping space 230 is n-sided.

In the embodiment, the crimping port of each gear ring cover plate 22 is approximately an n-sided opening. When the crimping teeth 23 are in the relaxed state, they effectively prevent the gear ring cover plates 22 from rotating relative to the crimping teeth 23 and perform limiting roles.

Furthermore, as shown in FIGS. 1 and 2, the gear ring 21 comprises a plurality of stacked gear ring plates. In the embodiment, three gear ring plates with same shape and structure are provided. The three gear ring plates are fixed together.

The bifurcation is provided at one end of the movable handle 11 and one end of the connecting handle 10 respectively. Three connection fulcrums are formed between the movable handle 11, the connecting handle 10, and the pliers head 20. A linkage mechanism is formed between the bifurcation of the movable handle 11 and the bifurcation of the connecting handle 10. When in use, the moving handle 11 and connecting handle 10 drive the pliers head 20 to crimp, which reduces a crimping stroke of the moving handle 11 and connecting handle 10. Further, a size of the crimping pliers 20 is small and is convenient for a user to use. When the pliers head 20 is crimping terminals of different diameters, the pliers head 20 contacts the terminal and crimping force is then fed back to the elastic support arms 102 and the elastic driving arms 112. The elastic support arms 102 and the elastic driving arms 112 perform a buffering role. Under condition of ensuring the crimping force, the elastic support arms 102 and the elastic driving arms 112 are deformed to complete a crimping action of the movable handle 11 and the connecting handle 10, so as to achieve a purpose of self-adaptation. The crimping of the crimping pliers is laborsaving, and effectively reduces labor intensity of the user. The elastic support arms and the connecting handle, the elastic driving arm and the movable handle are all integrated structures. The movable handle and the connecting handle are connected by a double elastic arm structure, which makes the crimping easy and has a longer service life. Therefore, the crimping pliers have advantages of simple structure, stable and reliable performance, and convenient operation.

The above are only optional embodiments of the present disclosure and are not intended to limit the present disclosure. Any modification, equivalent replacement and improvement made within the spirit and principle of the present disclosure shall be included in the protection scope of the present disclosure.

What is claimed is:

1. Crimping pliers, comprising:

a connecting handle;

a movable handle, and a pliers head arranged on one end of the connecting handle and one end of the movable handle;

wherein the one end of the connecting handle is bifurcated to form connecting arms and elastic support arms; the connecting arms are rotatably arranged on the pliers head and forms a linkage between the connecting handle and the pliers head; the one end of the movable handle is bifurcated to form movable connecting arms and elastic driving arms, the movable connecting arms are rotatably arranged on the pliers head and form a linkage between the movable handle and the pliers head; the elastic driving arms are rotatably arranged on the elastic support arms to make the movable handle rotatably connect with the connecting handle; limiting portions are arranged on the elastic support arms; a tension spring is arranged between the limiting portions and the movable handle;

the pliers head comprises a gear ring rotatably arranged on the movable connecting arms, two gear ring cover plates, and a plurality of crimping teeth distributed in an annular array; the two gear ring cover plates are separately arranged on two sides of gear ring and rotatably connected with the connecting arms; an accommodating cavity is formed between the gear ring and the two gear ring cover plates; the plurality of crimping teeth are respectively rotatably arranged in the accommodating cavity; each crimping tooth is in linkage with the gear ring, each crimping tooth moves along with the gear ring for mutual engagement between the crimping teeth.

2. The crimping pliers according to claim 1, wherein a limiting shaft is arranged on a bifurcation of the movable handle, a positioning shaft is arranged on the limiting portions; two ends of the tension spring are separately connected to the limiting shaft and the positioning shaft.

3. The crimping pliers according to claim 2, wherein one end of each crimping tooth comprises a stop portion; the gear ring comprises tooth grooves on an inner side of the gear ring; each tooth groove corresponds to each stop portion of each crimping tooth; each stop portion is engaged in each tooth groove to form a linkage between each crimping tooth and the gear ring; another end of each crimping tooth comprises a crimping portion; a wire crimping space is formed between each two adjacent crimping portions of the crimping teeth; each crimping tooth is rotatably arranged on a corresponding rotating shaft arranged between the two gear ring cover plates.

4. The crimping pliers according to claim 3, wherein an end surface of each stop portion is an arc-shaped end surface; a bottom surface of each tooth grooves is an arc-shaped bottom surface; each arc-shaped end surface of each stop portion is in surface contact with each arc-shaped bottom surface of each tooth groove, or there is a certain gap between each arc-shaped end surface of each stop portion and each arc-shaped bottom surface of each tooth groove.

5. The crimping pliers according to claim 4, wherein an arc groove is arranged on one side of each stop portion of each crimping tooth; each arc groove is configured to leaving a space for avoiding a corner of an opening of each tooth groove; a direction of the opening of each arc groove is same as a clockwise rotation direction of the gear ring.

6. The crimping pliers according to claim 5, wherein a side surface of each tooth groove opposite to the arc-shaped groove is an arc-shaped side surface or an inclined side surface; the side surface of each tooth groove faces a respective rotating shaft.

7. The crimping pliers according to claim 3, wherein the crimping portion of each crimping tooth comprises crimping bosses on opposite sides; a shape of each crimping boss is consistent with a shape of the crimping portion of each crimping tooth; each gear ring cover plate comprises a crimping port communicated with the accommodating cavity, and each crimping boss extends into a corresponding crimping port.

8. The crimping pliers according to claim 7, wherein a return groove is arranged on an inner wall of each crimping port; the return grooves one-to-one corresponds to the crimping bosses; when each crimping tooth is in a relaxing action, each crimping boss diverges outwardly, moves back, and inserts into a corresponding return groove.

9. The crimping pliers according to claim 7, wherein a tip of a cross section of each crimping boss arranged on any side has an included angle θ; $0=360°/n$; wherein n is a total number of the crimping bosses on one side and $n \geq 2$.

10. The crimping pliers according to claim 9, wherein side portions of any two adjacent crimping portions abut against each other and rotate in a clockwise direction or a counter-clockwise direction; the tip of a next crimping portion is arranged on a side of a previous crimping portion; n crimping portions form a closed loop and are located in a middle portion to form the wire crimping space; the wire crimping space is n-sided.

11. The crimping pliers according to claim 2, wherein the movable handle comprises two movable handle plates stacked with each other; the two movable handle plates are fixed together and arranged at intervals; the elastic support arms of the connecting handle are rotatably connected between the two movable handle plates; the tension spring is arranged between the two movable handle plates.

12. The crimping pliers according to claim 11, wherein the long handle comprises two long handle plates stacked with each other, the two long handle plates are fixed together; the elastic support arms of the two long handle plates are rotatably connected between the elastic driving arms of the two movable handle plates.

13. The crimping pliers according to claim 1, wherein the crimping pliers further comprises two handle sleeves; the connecting handle and the movable handle are wrapped by a respective handle sleeve.

14. The crimping pliers according to claim 13, wherein the connecting handle and the movable handle are clamped with the respective handle sleeve.

15. Crimping pliers, comprising:

a connecting handle;

a movable handle, and a pliers head arranged on one end of the connecting handle and one end of the movable handle;

wherein the one end of the connecting handle is bifurcated to form connecting arms and elastic support arms; the connecting arms are rotatably arranged on the pliers head and forms a linkage between the connecting handle and the pliers head; the one end of the movable handle is bifurcated to form movable connecting arms and elastic driving arms, the movable connecting arms are rotatably arranged on the pliers head and form a linkage between the movable handle and the pliers head; the elastic driving arms are rotatably arranged on the elastic support arms to make the movable handle rotatably connect with the connecting handle; limiting portions are arranged on the elastic support arms; a tension spring is arranged between the limiting portions and the movable handle;

wherein a limiting shaft is arranged on a bifurcation of the movable handle, a positioning shaft is arranged on the limiting portions; two ends of the tension spring are separately connected to the limiting shaft and the positioning shaft;

wherein one end of each crimping tooth comprises a stop portion; the gear ring comprises tooth grooves on an inner side of the gear ring; each tooth groove corresponds to each stop portion of each crimping tooth; each stop portion is engaged in each tooth groove to form a linkage between each crimping tooth and the gear ring; another end of each crimping tooth comprises a crimping portion; a wire crimping space is formed between each two adjacent crimping portions of the crimping teeth; each crimping tooth is rotatably arranged on a corresponding rotating shaft arranged between the two gear ring cover plates.

16. Crimping pliers, comprising:

a connecting handle;

a movable handle, and a pliers head arranged on one end of the connecting handle and one end of the movable handle;

wherein the one end of the connecting handle is bifurcated to form connecting arms and elastic support arms; the connecting arms are rotatably arranged on the pliers head and forms a linkage between the connecting handle and the pliers head; the one end of the movable handle is bifurcated to form movable connecting arms and elastic driving arms, the movable connecting arms are rotatably arranged on the pliers head and form a linkage between the movable handle and the pliers head; the elastic driving arms are rotatably arranged on the elastic support arms to make the movable handle rotatably connect with the connecting handle; limiting portions are arranged on the elastic support arms; a tension spring is arranged between the limiting portions and the movable handle;

wherein a limiting shaft is arranged on a bifurcation of the movable handle, a positioning shaft is arranged on the limiting portions; two ends of the tension spring are separately connected to the limiting shaft and the positioning shaft;

wherein the movable handle comprises two movable handle plates stacked with each other; the two movable handle plates are fixed together and arranged at intervals; the elastic support arms of the connecting handle are rotatably connected between the two movable handle plates; the tension spring is arranged between the two movable handle plates.

* * * * *